United States Patent Office 3,305,307
Patented Feb. 21, 1967

3,305,307
PRODUCTION OF SOLID ALKALI METAL SULFITES
Walter Spormann, Bad Durkheim-Seebach, and Joachim Heinke, Ludwigshafen (Rhine), Germany, assignors to Badische Anilin- & Soda-Fabrik Aktiengesellschaft, Ludwigshafen (Rhine), Germany
No Drawing. Filed Sept. 16, 1960, Ser. No. 56,353
Claims priority, application Germany, Sept. 25, 1959, B 54,925
2 Claims. (Cl. 23—129)

This invention relates to the production of alkali sulfites from solutions containing alkali hydroxides or/and alkali carbonates, especially from caustic soda solution or soda solution, and gases containing sulfur dioxide, especially roaster gases.

It is known that oxidation of alkali sulfite very readily takes place and is catalytically accelerated by heavy metal ions, the presence of which is difficult to avoid. To obviate this oxidation in the production of sulfites it would be necessary to exclude atmospheric oxygen by using concentrated sulfur dioxide or by carrying out the reaction between sulfur dioxide and alkali hydroxide or alkali carbonate solution in an inert gas atmosphere. These measures, however, are very troublesome and difficult to realize in industry.

It is further known that undesirable oxidation of alkali sulfite can be suppressed by adding to the solutions containing alkali hydroxide, substances, as for example glue, which are capable of binding heavy metal ions, thus making them catalytically inactive. In this way sulfite solutions are obtained which contain the substances added as impurities and these impurities contaminate the solid alkali sulfite separated from the solution to a greater or lesser extent. In these circumstances it is usual to tolerate a certain amount of oxidation in the production of alkali sulfite, from solutions containing alkali hydroxide or alkali carbonate and sulfur dioxide, so that commercial alkali sulfite usually contains more or less large amounts (up to 10%) of sulfate as impurity.

One object of this invention is to provide solid alkali sulfite with negligible contamination by alkali sulfate. Another object of the invention is to provide solid alkali sulfate without using glue as an oxidation inhibitor. A further object of the invention is the production of alkali sulfite from gases containing sulfur dioxide and a large amount of oxygen.

These and other objects of the invention are achieved by finely dispersing an aqueous solution of an alkali compound such as sodium hydroxide, sodium carbonate, sodium bicarbonate, potassium hydroxide, potassium carbonate, potassium bicarbonate or mixtures thereof in a substantially dry gas containing sulfur dioxide and separating the alkali sulfite thereby formed from the gas. By the term "substantially dry gas" we understand a gas in which the water of the alkali solution dispersed therein is immediately vaporized, i.e., a gas with a low relative humidity.

The formation of sulfate can be especially safely avoided by atomizing the solution in a hot gas containing sulfur dioxide. It is advantageous to apply temperatures at which the water introduced with the solution and formed by the reaction is immediately vaporized. The temperature of the hot gas may be varied within wide limits. If the gas used has a low content of humidity, a temperature as low as about 20° C. may be sufficient in order to quickly vaporize the drops of liquid. Obviously, it is also possible to use gases at high temperatures, for example at temperatures up to 150° C. The sulfite is then formed instantaneously in dry form and is no longer exposed to the action of the oxygen present in the gas. In this way, the formation of sulfate is substantially avoided. Gases containing sulfur dioxide which hitherto could not be used for the production of sulfite by reason of their high oxygen content are therefore suitable for the process according to this invention, especially waste gases containing sulfur dioxide from sulfuric acid plants. The ratio of oxygen to sulfur dioxide in the said gases may be as high as 50 parts by volume of oxygen per part by volume of sulfur dioxide. The small amounts of sulfate which are contained in the sulfite obtained from these gases by the process according to this invention originate from the sulfur trioxide content of the gas. The aqueous solution of the alkali compound may have any desired concentration. We prefer to use concentrated solutions, i.e., solutions containing more than 10% of alkali compound. Dilute solutions, i.e., solutions containing less than 10% of alkali compound are also suitable for the process according to the present invention. Dilute solutions have the disadvantage that a larger amount of water has to be evaporated than with concentrated solutions in order to obtain dry alkali sulfite. In general, dilute solutions will be successfully atomized only in very dry gases, while concentrated solutions can also be atomized in moderately dry gases. To adjust the concentration of the alkali solution according to the relative humidity of the gas will be within the skill of any expert who has read the present specification.

The amount of alkali compound present in the aqueous solution should be equivalent, or less than equivalent, to the amount of sulfur dioxide contained in the gas. If less than the equivalent amount of alkali compound is used, there is the risk that the sulfur dioxide is incompletely removed from the gas. The amount of alkali compound to be added is within the skill of the expert.

Atomization of the solution preferably takes place into an upwardly directed gas stream because the heavy liquid drops and the light sodium sulfite particles may be readily separated from each other by taking advantage of gravitation and the flow resistance acting against the same.

The following example will further illustrate this invention but the invention is not restricted to this example.

*Example*

Into a tube having a diameter of 60 centimeters and a length of 3 meters there are led upwardly 500 cubic meters per hour of a waste gas from a sulfuric acid plant, the gas containing 0.2% by volume of sulfur dioxide and 10% by volume of oxygen as well as 0.007% of sulfur trioxide. The gas has a temperature of 45° C. Into this gas stream there are atomized by means of an atomizer nozzle 7 liters per hour of a 30% caustic soda solution. Atomization takes place against the direction of the gas stream. In a cyclone arranged after the tube there separate per hour about 4.5 kilograms of dry sodium sulfite which contains about 3.5% of sulfate.

We claim:
1. A process for the production of solid alkali metal sulfite which comprises: passing a finely dispersed aqueous solution of an alkali metal compound selected from the group consisting of sodium hydroxide, sodium carbonate, sodium bicarbonate, potassium hydroxide, potassium carbonate, potassium bicarbonate and mixtures thereof, into a substantially dry gas containing sulfur dioxide, maintaining the temperature of said dry gas at a level such that the water introduced with the solution and formed by the reaction of the alkali metal and the sulfur dioxide is immediately vaporized, and thereafter separating from the gas the solid alkali metal sulfite which is formed by the reaction of the sulfur dioxide and the alkali metal compound.

2. A process for the production of solid alkali metal sulfite which comprises: passing a finely dispersed aqueous solution of an alkali metal compound selected from the group consisting of sodium hydroxide, sodium carbonate, sodium bicarbonate, potassium hydroxide, potassium carbonate, potassium bicarbonate and mixtures thereof into an upwardly directed stream of a substantially dry gas containing sulfur dioxide, said dry gas being maintained at a temperature between about 20 and about 150° C., said temperature being such that the water introduced with the solution and formed by the reaction of the alkali metal and the sulfur dioxide is immediately vaporized, and thereafter separating from the gas the solid alkali metal sulfite which is formed by the reaction of the sulfur dioxide and the alkali metal compound.

References Cited by the Examiner
UNITED STATES PATENTS

| | | | |
|---|---|---|---|
| 1,023,179 | 4/1912 | Strickler | 23—129 |
| 1,091,429 | 3/1914 | Friedrich et al. | 23—129 |
| 1,982,241 | 11/1934 | Aydelotte et al. | 23—129 |
| 2,210,405 | 8/1940 | Haywood | 23—129 |

OTHER REFERENCES

Comprehensive Treatise on Inorganic and Theoretical Chemistry, by Mellor, vol. 10, page 263.

OSCAR R. VERTIZ, *Primary Examiner.*

MAURICE A. BRINDISI, *Examiner.*

J. A. KOLASCH, A. J. STEWART, B. H. LEVENSON,
*Assistant Examiners.*